July 20, 1948.  J. HOCH  2,445,742
AUTOMATIC MOLDING MACHINE AND METHOD
Filed Dec. 7, 1944  4 Sheets-Sheet 1

Fig. 1

INVENTOR
John Hoch
BY
ATTORNEY

July 20, 1948.  J. HOCH  2,445,742
AUTOMATIC MOLDING MACHINE AND METHOD
Filed Dec. 7, 1944  4 Sheets-Sheet 2

Fig. 2

INVENTOR
John Hoch
BY
ATTORNEY

July 20, 1948. J. HOCH 2,445,742
AUTOMATIC MOLDING MACHINE AND METHOD
Filed Dec. 7, 1944 4 Sheets-Sheet 3

Fig.3

INVENTOR
John Hoch
BY
ATTORNEY

July 20, 1948.  J. HOCH  2,445,742
AUTOMATIC MOLDING MACHINE AND METHOD
Filed Dec. 7, 1944  4 Sheets-Sheet 4

Fig. 4

INVENTOR
John Hoch
BY
Harry Jacobson
ATTORNEY

Patented July 20, 1948

2,445,742

UNITED STATES PATENT OFFICE 2,445,742

AUTOMATIC MOLDING MACHINE AND METHOD

John Hoch, Corona, N. Y., assignor to Victor Metal Products Corporation, Brooklyn, N. Y., a corporation of New York Application December 7, 1944, Serial No. 567,006

22 Claims. (Cl. 18—20)

1

This invention relates to machines and methods for molding thermosetting plastics and particularly to those designed for automatic operation from the feeding of the uncured plastic in the form of powder to the collection of the finished molded product.

The invention contemplates the provision of a machine for first molding uncured pellets preferably though not necessarily of thermosetting plastic, then transferring and simultaneously heating the pellets, molding the desired article and finally discharging the article, the machine operating continuously and automatically and requiring only the supply of suitable powder thereto at intervals.

The invention also contemplates the provision of a method for performing the operations above mentioned.

The various objects of the invention will be clear from the description which follows and from the drawings, in which.

In the practical embodiment of the invention shown by way of example, a pellet forming mechanism is utilized to form the uncured pellets, which are automatically transferred on to a heating belt to accumulate and maintain hot a sufficient number of such pellets to supply the molding mechanism, the pellets being transferred individually and successively from the moving belt to the continuously operating molding mechanism. A separate molding mechanism is provided to receive each pellet, the mechanism serving to mold the pellet and heat it for a sufficient time to set it into its final molded form, after which the thus molded articles are stripped from the molding mechanism and are discharged one by one and at high speed from the machine.

Figure 1:
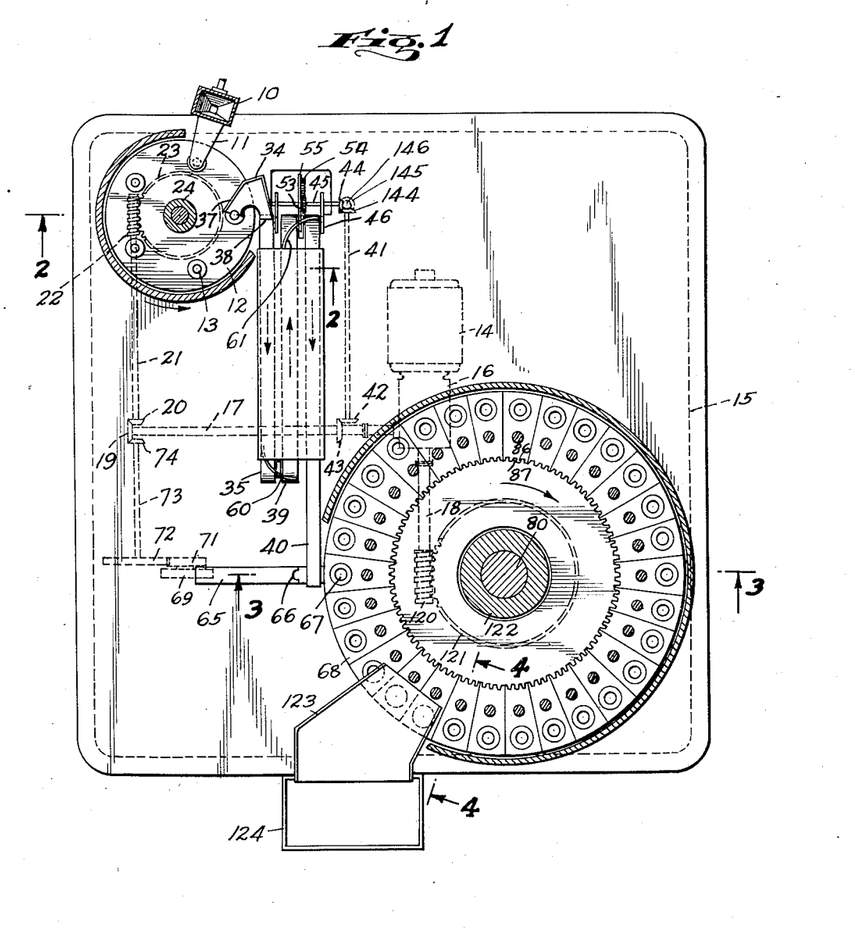
Fig. 1 is a top plan view of the machine.
Figure 2:
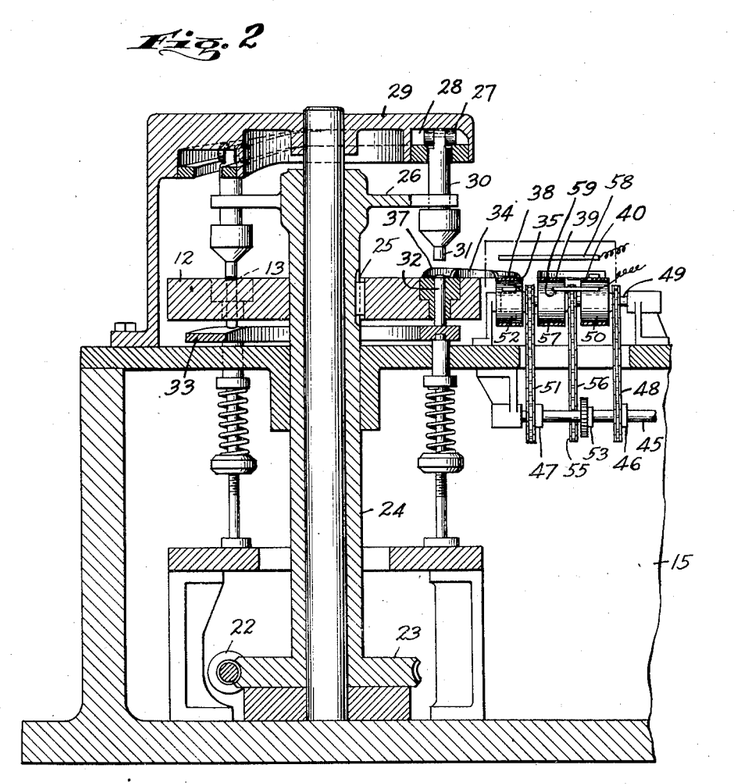
Fig. 2 is a vertical section of the pellet forming, heating and transferring means taken on the line 2—2 of Fig. 1.

Referring to Figs. 1 and 2, the pellet forming mechanism comprises the hopper 10 supplied at the required intervals with suitable material such as thermosetting or the like plastic in loose powder form. The powder is fed by gravity through the chute 11 toward the turntable 12. Cavities as 13 in succession reach the loading position at the chute on the rotation of the turntable. A suitable cut-off member such as a plate, bladewheel or the like becomes operative after the cavity is loaded, to cut off the supply of powder and insures the insertion of the correct amount of powder into the cavity. The cut-off mechanism being well known no further description nor illustration thereof is deemed necessary.

To rotate the turntable, a motor as 14 (Fig. 1) is supported by the frame 15 of the machine, and through suitable reduction gearing 16 drives the shaft 17 for the molding mechanism and pellet transfer, and also drives the shaft 18 for the molding and heating mechanism. The bevel gear 19 on the end of the shaft 17 meshes with the bevel gear 20 on the shaft 21 carrying the worm 22 engaging the worm wheel 23 on the hollow turntable shaft 24, to which the turntable is keyed as at 25.

Suitable means, best shown in Fig. 2, are provided to compress the plastic material in the cavities 13 to produce a pellet. Said means as shown takes the form of a series of reciprocatory plungers 30 each slidably mounted in an arm 26 extending from the turntable shaft 24 and provided at its upper end with a cam roller 27 entering the fixed cam groove 28 of the fixed frame member 29. Said groove is so shaped as to lower the plungers 30 just after the mating cavity of the turntable has moved out of the powder loading position, whereby the reduced end 31 of the plunger enters the corresponding cavity and compresses the powder therein to enable it to hold together firmly enough for molding purposes.

The slope of the walls of the cam groove 28 determines the amount and time of reciprocatory strokes of the plungers, it being understood that the powder in each cavity is maintained in a compressed condition for a sufficient angular movement of the turntable to bind the powder particles together into a pellet. It will be understood that the turntable together with the plunger-supporting arms 26 and the plungers 30 carried thereby all rotate as a unit continuously, to carry the cam rollers around the cam groove and thereby to reciprocate the plungers at the proper times.

Before the turntable makes a complete revolution back to the loading position of any selected cavity, the cam lifts the plunger out of its cavity and the pellet is also lifted out of its cavity preparatory to its transfer to the molding mechanism. The means serving this purpose comprise the pins 32 each resting at its lower end on the second fixed cam 33 and normally retained by said cam in its lowermost position in its cavity 13. The cam 33 is so shaped that the lower end of the pin is raised enough to bring the upper end of the pin flush or in a position coplanar with the upper surface of the turntable 12 when said turntable approaches the pellet discharge guide 34. The bottom face of the pellet is thereby brought up to the level of the turntable face in position to slide on said face and ready for transfer to the nearest heating belt 35.

It will be noted that the pellet which has been freed from its cavity rotates on and with the turntable 12 and has consequently acquired momentum and is subject to the action of centrifugal force. The above-described release of the pellet from the cavity occurs just prior to the time the pellet reaches the guide 34. Consequently the momentum of the pellet when its further advance is halted by the wall 37 of the guide causes the pellet to strike said wall with considerable force and to cause the pellet to rebound therefrom toward the discharge space 38 in said guide and on to the upper continuously moving surface of the belt 35. Since the pellets are released at the same point and the guide is fixed it will be noted that the pellets reach the belt 35 in a predetermined and constant spaced relation. Said belt is one of a series of such belts as 39 and 40, the series comprising enough belts to properly space and accumulate pellets for later feeding to the molding mechanism and to allow sufficient time thoroughly to heat said pellets. The belts are driven through the shaft 41 carrying the bevel gear 42 meshing with the bevel gear 43 on the shaft 17 (Fig. 1). The bevel gear 144 on the shaft 41 meshes with a lower bevel gear on the upright shaft 146 which carries at its upper end a second bevel gear 145 meshing with the bevel gear 44 on the chain shaft 45 (Fig. 2) on which shaft are mounted the sprocket wheels 46 and 47. The chain 48 passes around the sprocket wheel 46 and around a similar sprocket wheel loosely mounted on the shaft 49 and carrying the belt pulley 50. Similarly, the chain 51 passes around the sprocket wheel 47 and engages the sprocket wheel secured to the pulley 52 and loosely mounted on the shaft 49. It will thus be seen that the belts 35 and 40 move continuously in the same direction. However, the belt 39 arranged intermediate the belts 35 and 40 is moved in the opposite direction. This is accomplished through the gear wheel 53 on the shaft 45 which meshes with the gear wheel 54 carrying the sprocket wheel 55. The chain 56 leading from said sprocket wheel passes around a sprocket wheel fixed to the pulley 57 and loosely mounted on the shaft 49. It has been above indicated that the pellets are heated while on the belts. This may be done by any suitable heating means but it is preferred to use electrically energized induction heating means producing an electrically charged field through which the pellets are passed thereby creating internal heat by induction within the pellets as distinguished from the supply of external heat by convection, radiation or contact with flammable heat. Such means is indicated by the members 58 and 59 (Fig. 2) between which members the belts and pellets are arranged. The upper member 58 is sufficiently wide and long to extend substantially along the length of the belts and across the combined widths thereof, while the lower member 59 may be cut away where necessary to prevent interference with the mechanism.

To transfer the pellets successively from the belt 35 to the belt 39 a stationary guide 60 is provided between the belts 35 and 39, said plate having an upright curved deflecting wall and a guide support surface bridging the gap between the belts if necessary. A similar deflecting plate and guide 61 is provided between the belts 39 and 40, being arranged at the adjacent ends of said belts nearest the pellet forming mechanism while the guide 60 is at those ends of the belts 39 and 35 remote from said pellet forming mechanism. The belt 40 is longer than the other belts extending past the guide 60 a sufficient distance to permit suitable transfer mechanism to operate intermittently to transfer the spaced pellets one at a time from the belt 40 to the molding mechanism. The transfer means (Figs. 1 and 3) comprises the bell-crank-lever 62 pivoted as at 63 and connected at one end by the link 64 to the reciprocatory transfer plate 65. Said plate is provided with a concave end edge 66 adapted to engage a pellet on the belt 40 and to move said pellet transversely of the belt into an open cavity 67 in a segment 68 of the molding mechanism. Oscillation of the lever 62 alternately forwards said plate to advance a pellet and then retracts the plate ready for a repetition of the operation. The bell-crank-lever 62 is oscillated through the cam 69 on the shaft 70 which shaft carries the gear 71 meshing with the gear 72 on the shaft 73, said shaft having a bevel gear 74 meshing with the gear 19 on the shaft 17.

Figure 3:
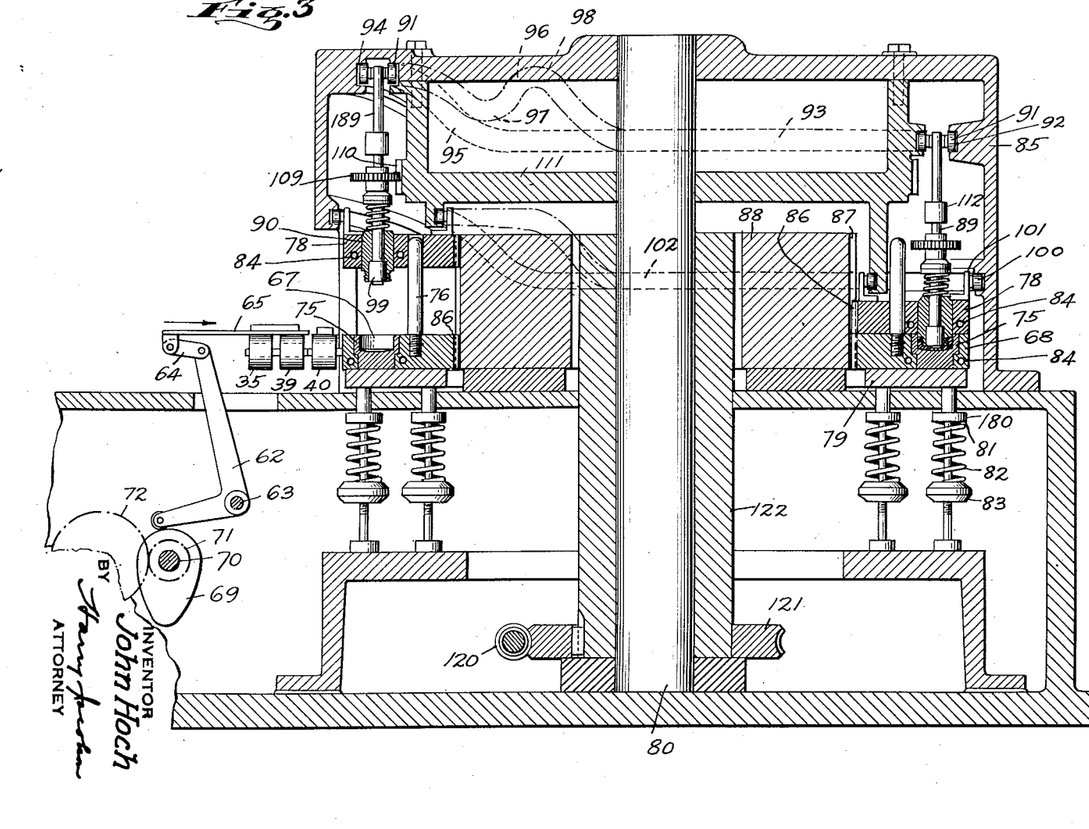
Fig. 3 is a vertical section of the continuously operating molding and stripping means taken on the line 3—3 of Fig. 1.
Figure 4:
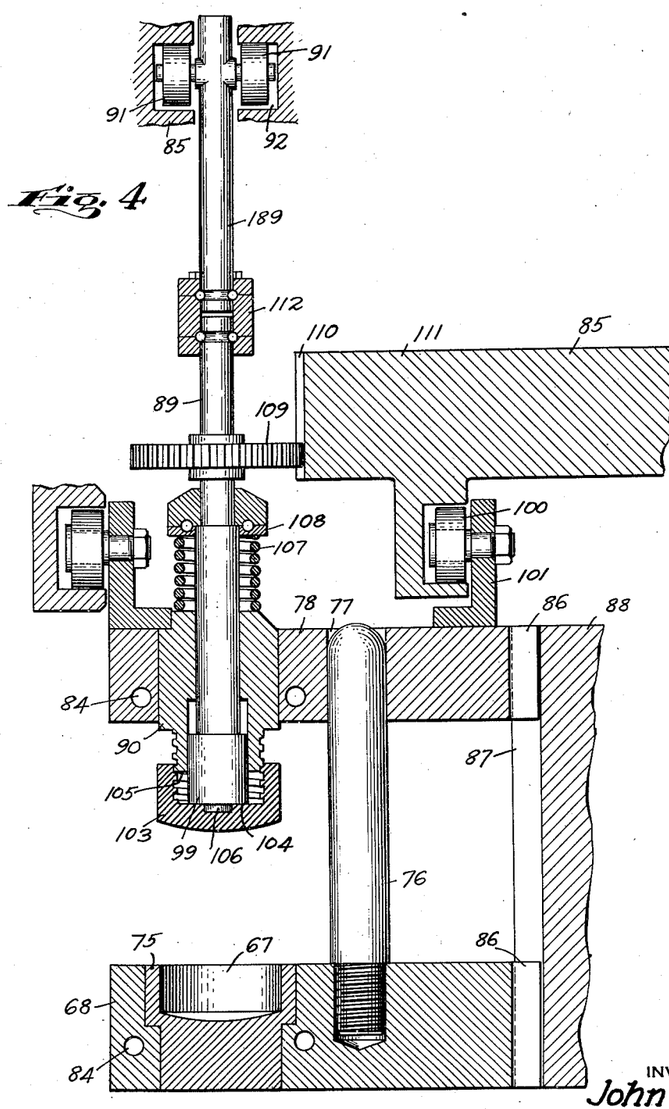
Fig. 4 is a vertical section on an enlarged scale of the molding and stripping mechanism taken on the line 4—4 of Fig. 1.

The molding mechanism comprises a plurality of substantially identical wedge-shaped segments 68 each provided with a female mold number 75 and with a guide pin 76 entering the opening 77 of the male mold segment 78, said segments 68 being suitably supported as by means of the ring 79 on which the female mold segments slide while rotating about the axis of the shaft 80. To yieldably support the female molds and the ring 79 so as to yield when undue pressure beyond a predetermined limit is put upon the molds and the ring, said ring is provided with downwardly extending lugs as 180 terminating in shoulders 81 resting on the springs 82 which in turn rest on the adjustable spring stops 83. Suitable passages as 84 are made in the female mold segment and in the male mold segment for suitable heating means such as steam or electrical heating means as may be found convenient and desirable for the purpose of heating both of the molds and maintaining the pellet in proper condition for molding, the heating means also serving to set the article molded from the pellet while said article is held under the compression of the mating male and female molds. It will be noted that the pins 76 maintain the mold segments in their proper vertical and transverse relation so that the molds will properly register when brought together, said pins also preventing dislocation of the segments relatively to each other and the connection of the upper or male segment with the frame 85 in a manner later to be described preventing dislocation of the pairs of segments as units.

To permit locking of all of the segments in place relatively to each other while at the same time allowing relative vertical movement thereof, each of the segments 68 and 78 are provided at their inner surfaces with suitable teeth as 86 meshing with corresponding teeth as 87 in the gear 88 fixed to the shaft 122. It will thus be seen that on rotation of said shaft all of the mold segments rotate as a unit while the male segments may be moved vertically toward and from the female segments. To accomplish such relative movement the upright shaft 89 passing through the male mold 90 carries at its upper end the cam rollers 91 operating in the cam groove 92 of the frame 85. Said cam groove, as best seen in Fig. 3, is provided with a horizontal portion 93 of substantial extent, with a second shorter horizontal portion 94 in upward spaced relation to the portion 93 and with an inclined portion 95 joining one end of the portion 94 to the corresponding end of the portion 93. The other ends of said portions 93 and 94 are joined by the cam portion 96 of peculiar shape designed to operate the stripping mechanism as will be pointed out in more detail hereinafter.

Suffice it to say at this point that the shape of the cam portion 96 as shown is preferably sinuous having a valley 97 and a crest 98. The cam is effective to raise and lower the shaft 89 and the terminal plug 99 thereon at the proper time to perform its part in the molding and stripping operations.

To raise and lower the male mold segments 78 individually relatively to their respective female mold segments 68, each of the segments 78 carries a pair of cam rollers 100 supported by the brackets 101 and operating in the fixed cam groove 102 in the machine frame. Said groove 102 is substantially identical with the cam groove 92 except that the sinuous portion 96 of the latter is replaced by a horizontal portion in the former (Fig. 3). Consequently, the male mold with the plug 99 therein are raised and lowered as a unit and maintained against relative movement by the identical parts of the cams 92 and 102 respectively until after the article 103 has been molded, set and removed from the female mold. Thereafter, the plug 99 is simultaneously lowered and rotated relatively to the male mold by the cam portions 97 and 98 and gearing later to be described to strip the article therefrom, the rotation being synchronized with the downward movement to unscrew the article from the mold if the article has been molded with a screw thread thereon.

Normally, the plug 99 is raised within the hollow male mold 90 to align its lower surface 104 with the lower surface 105 of the male mold and the polygonal extension 106 projecting below said surfaces. The spring 107 interposed between the male mold 90 and the bearing 108 fixed to the shaft 89 serves to hold the plug yieldingly in its normal or retracted position within the male mold. To lower and simultaneously rotate said plug into the position of Fig. 4 and thereby to unscrew the article, the cam portion 97 becomes effective to perform the lowering operation and the gear 109 on the shaft 89 effects the rotation. Said gear in the operative position thereof meshes with the fixed gear teeth 110 on the frame part 111 of the machine, said teeth 110 being long enough to remain in mesh with the teeth of the gear 109 during the sliding movement of the gear 109 therepast and long enough to maintain such intermeshing for a sufficient time to cause rotation of the plug the required number of turns to perform the desired unscrewing or stripping operation. The cam portion 98 raises the shaft 89 sufficiently to mesh the gear 109 with the teeth 110 only when the mold segments approach the article stripping station of the turntable, and only after the cams 96 and 102 have removed the male mold, plug and molded article from the female mold, to free the article completely. (See Fig. 3 for the uppermost and lowermost positions of the male mold.) Rotation of the turntable then results in planetary movement of the gear 109 around the teeth 110 with consequent rotation of said gear and of the plug 99, the projection 106 of which engages a corresponding depression molded thereby in the article so that the rotation of the gear, plug and projection together with the synchronized downward movement of the plug unscrews or strips the article from the male mold. After stripping, the cam portion 98 raises the plug 90, after which the plug and male mold segment are ready to be again lowered by the cams 92 and 102 to mold another pellet.

It will be noted that the upper part 189 of the shaft 89 is independent of the lower part of said shaft insofar as relative rotation of said shaft parts is concerned, so that the shaft part 189 may turn as a unit about a vertical axis with the cam rollers 91 during the movement of said rollers around the cam groove 92. The lower part of said shaft may also rotate for stripping purposes under the influence of the gear 109 without interference with the action of the cam rollers. To accomplish this, the ball bearing coupling 112 connects the ends of said shaft parts for axial reciprocation as a unit but for independent rotation.

It will also be noted that the comparatively tight sliding fit of the plug 99 in the male mold, which is advisable to avoid undue flash on the molded article, tends to resist rotation of the plug beyond that imparted positively thereto by the gear 109, whereby said gear is normally maintained in the proper position to be raised into meshing engagement with the gear 110 after it has been lowered out of mesh therewith, which occurs when the male mold plugs are first lowered into the female mold by the cams 92 and 102.

The turntable of the molding mechanism including the ring 79, the various segments with their molds and cam rollers are continuously rotated by means of the worm 120 on the shaft 18, said worm meshing with the worm wheel 121 on the hollow turntable shaft 122 supported by the shaft 80.

A summary of the operation of the machine follows.

Power being supplied to the motor 14, and powdered plastic to the hopper 10, the turntable 12 and the mold segments are continuously rotated at the proper speed about their respective axes of rotation. At the same time, the belts 38 and 40 move continuously in the same direction as each other, and the intermediate belt 39 moves in the opposite direction. During the rotation of the turntable, the dispenser in the chute 11 operates to release and deposit the required amount of powder in each cavity 23 when such cavity is at the loading position underneath the chute. When the loading cavity has passed the chute, the cam 28 becomes operative to lower the plunger 31 into the cavity to compress the powder into a pellet. Just before the cavity, plunger and pellet reach the guide 34, the cam 28 raises the plunger and the cam 33 raises the pellet through the pin 32, thereby freeing the pellet from the cavity. Further rotation of the turntable carries the pellet forcibly against the guide 34 from which it rebounds and is guided on to the belt 35. While on said belt and while on the other belts 39 and 40 to which it is transferred by the guides 60 and 61 respectively the pellet is heated by the electronic heating members 58 and 59 ready for molding.

Transfer of the pellet to the mold cavity 67 of the molding mechanism is effected by the reciprocating transfer plate 65. During the rotation of the mold segments, the male mold 90 and plug 99 are first brought down into the loaded female mold to mold and heat the pellet, forming internal screw threads in the article 103 illustrated. The molds are kept together by the cam 92 during almost the entire rotation of the segments, that is, through an angular movement of approximately 270°.

During the last part of the rotation, the male mold and its plug are lifted out of the female mold by the cams 92 and 102 and the gear 109 carried into meshing engagement with the teeth 110. Further rotation of the segment causes rotation of said gear and of the plug 99 which is simultaneously lowered by the cam part 97 to strip the threaded article owing to the wrench-like action of the projection 106 of the plug. The finished stripped article drops into the chute 123 and thence into a suitable receptacle as 124.

It will be seen that I have provided a continuous method for making pellets, transferring them while heating them electronically and molding the pellets while maintaining the required heat and pressure thereon and then unscrewing them, all while the pellets and articles are continuously in motion and without the necessity of halting their movement at any time until they are finished and collected.

It will also be seen that I have provided a continuously operating automatic machine for continuously forming pellets and heating, molding and stripping them and have devised a machine operable at high speed and requiring only the supply thereto of suitable powdered plastic.

I claim:

1. In a continuous molding machine, means for forming plastic pellets, moving belt means for receiving, moving and simultaneously heating the pellets, article molding means, means interposed between the pellet forming means and the molding means for feeding one pellet at a time from the belt means to the molding means, said molding means comprising a series of pairs of cooperating molds arranged circumferentially around and rotating continuously about a central axis, means for relatively reciprocating each pair of molds first to close the molds about a pellet for a predetermined amount of rotation of the pair of molds about said axis thereby to mold an article and to permit said article to set and then to open the molds with the article attached to a selected one of the pair of molds, and rotatable means responsive to the reciprocation of the molds and reciprocating relatively to the molds for stripping the article from said selected mold during the rotation of said series of molds and while the pair of molds remain separated.

2. In a continuous machine of the character described, means for forming, heating, and advancing pellets continuously including a moving belt, continuously operating article molding means, a reciprocating member for feeding a single moving pellet at a time from the belt to the molding means during the advance of the pellets, said molding means first compressing the pellet to shape the same into an article, then maintaining the article compressed while heating the article, and finally releasing the article from the compression thereon, and means carried by and movable relatively to the molding means for stripping the released article from the molding means.

3. In a machine for continuously molding articles from powdered plastic material, means for forming, heating, and advancing pellets of said material, a pair of similar coaxially arranged rings of molds, means for continuously rotating the rings, one of said rings comprising a series of female molds and the other ring comprising a series of male molds each adapted to mate with a corresponding female mold, means for loading each female mold with a pellet at a selected point of a revolution of the rings, including belts moving in opposite directions, one of said belts receiving the pellets advanced by the first mentioned means, means for transferring the pellets from said one belt to the adjacent belt and reciprocating means for moving pellets from the last of the belts to the female mold, means for moving a pair of mating molds relatively to mate the molds after the female mold is loaded, and means to separate said mating molds in advance of the loading point.

4. In a machine of the character described, a continuously rotating ring of toothed segments carrying female molds, a similar ring of toothed segments carrying male molds rotating as a unit with the ring of female molds, a gear engaging the toothed segments for rotating the rings, means for reciprocating the segments successively toward and from each other and out of and back into the rings at predetermined points in a revolution of said rings, a stripping plug normally within each male mold, and means for rotating and axially advancing the plug at a selected point in the revolution of said rings and independently of the remaining plugs.

5. The method of molding plastic articles comprising molding pellets from powdered plastic, spacing said pellets apart a predetermined distance while facing the pellets all in the same direction, heating the spaced pellets while the pellets are moved in a horizontal straight line path first in one direction and then in the opposite direction, such heating being accomplished by passing the pellets repeatedly through an electrically charged field and thereby inducing heat internally within the pellets, and shaping the pellets under heat and pressure into the desired articles while the pellets are in motion.

6. The method of molding plastic articles comprising molding pellets from powdered plastic, moving the pellets first in one straight horizontal direction and then in the opposite direction, inducing heat internally in said pellets to heat the pellets while the pellets are in motion by passing the pellets repeatedly through an electrically charged field, moving the pellets through a circular path while applying heat and pressure thereto in a confined space to shape said pellets into the desired articles, and freeing said articles from confinement to collect the articles.

7. The method of continuously forming molded articles from powdered plastic comprising successively molding pellets of said material, moving said pellets horizontally in straight line paths first in one direction and then in the opposite direction for a predetermined time through an electrically charged field to induce heat internally in the pellets, molding the hot pellets successively into the desired articles under heat and pressure while advancing the pellets continuously and collecting the articles.

8. In a machine of the character described, means for forming a pellet of powdered material, means for heating and simultaneously transferring a plurality of pellets to the molding and heating means hereinafter mentioned including a moving belt for receiving the pellets from the pellet forming means and means having parts respectively arranged on opposite sides of the belt for inducing heat in the plurality of pellets carried by the belt, molding and heating means for forming the pellet into an internally threaded article, means for forwarding pellets in succession from the belt to the molding means, and means for stripping the molded article from the molding means, said molding means comprising a continuously rotatable turntable provided with a multiplicity of mold cavities, a reciprocating plunger for each cavity mounted for rotation with the turntable, and a fixed cam cooperating with the plungers first to move a plunger into a cavity loaded with a pellet by said pellet forwarding means to mold the pellet, then to maintain the molded pellet compressed for a sufficient time to set said pellet into a molded article, and then to remove the plunger from the cavity with the article on the plunger, said stripping means including a rod passing through each of the plungers, means including a second fixed cam and an operative connection between the second cam and the rod for reciprocating the rod relatively to its plunger when the plunger reaches a predetermined point in the rotation of the turntable, and means operative only during the simultaneous reciprocation of the rod and the rotation of the turntable to rotate the rod about the axis of the rod.

9. In a continuously operating molding machine, continuously operated pellet molding mechanism for successively forming plastic pellets, means for heating and simultaneously transferring the pellets one at a time and in succession to the molding means hereinafter mentioned including a moving belt for receiving the pellets in spaced relation from the pellet forming mechanism and a reciprocating member timed successively to engage each pellet on the belt to move said pellet transversely to the belt into a female mold cavity while the belt is in motion, said molding means comprising a series of female molds each having a mold cavity, means in the form of a series of substantially identical segments each carrying one of the female molds, said segments being wedge shaped and having substantially flat converging sides, said segments being arranged adjacent each other, means for supporting and locking said segments together for rotation as a unit and for individual reciprocation independently of the remaining segments, a series of similar segments mounted for individual reciprocation toward and from the female molds and each carrying a male mold, a stripping member mounted in and coaxially with each of the male molds, means for reciprocating the segments successively and at predetermined intervals with the stripping member as a unit, and means for reciprocating and simultaneously rotating the stripping member relatively to the particular male mold in which said stripping member is mounted after said male mold has been separated from its corresponding female mold to strip the article molded on the male mold by said molds from the male mold, said last mentioned means operating successively upon each of the stripping members as it reaches a predetermined position during the rotation of the segments.

10. In a continuous machine of the character described, continuously operating mechanism for molding pellets having opposite flat faces including a turntable rotatable about a vertical axis and having a flat upper face to support the pellets with the flat faces of the pellets horizontal, means at the upper face of the turntable for removing the pellets from the turntable and for advancing the pellets in succession and with the flat faces thereof horizontal, a moving belt cooperating with the pellet removing means to receive the pellet with one of the flat faces of the pellet resting on the belt, and electrically energized induction heating means having a pair of horizontally arranged elements in vertical spaced relation and arranged respectively adjacent opposite faces of the belt, said heating means inducing heat internally within the pellets while the pellets are interposed between and are moved between said elements by the belt.

11. A machine according to claim 10 including means for removing one pellet at a time from the belt after the pellet has passed the heating means and for advancing the pellet for further operation thereupon.

12. In a machine of the character described, a plurality of moving belts arranged adjacent each other and each having the upper reach thereof horizontal to support and advance flat pellets, each belt moving in a direction opposite to the direction of movement of the belt adjacent thereto, means for transferring the pellets successively from one belt to the adjacent belt, an electrically energized element adjacent the upper faces of the upper reaches of the belts, a cooperating electrically energized element adjacent the under faces of the upper reaches of the belts, said elements cooperating to induce internal heat within the pellets while the pellets are between said elements thereby to heat the pellets while the belts and the space surrounding the belts remain substantially unheated by the elements, and means for moving the heated pellets under control and in a flat position off a selected belt.

13. In a machine of the character described, means for forming pellets, a plurality of belts, at least two of said belts moving in opposite directions and arranged adjacent the pellet forming means, one of said belts receiving the pellets from the pellet forming means, electrically energized means arranged transversely of the direction of travel of the belts for internally heating only the pellets on the belts during the movement of the pellets and comprising a pair of electrically energized spaced apart elements arranged respectively adjacent opposite faces of the belts and inducing heat in the pellets between said elements, means for removing the pellets successively from the belts and for depositing one pellet at a time in the molding means hereinafter mentioned, molding means receiving the pellets successively, said molding means comprising a series of pairs of cooperating molds arranged in the form of a ring, means for continuously rotating said molds as a unit about a central axis, means for opening and closing each pair of molds and maintaining each said pair of molds closed for a predetermined interval and heating said molds, and means carried by one of the molds of each pair of molds for stripping the article molded by said pair of molds from said molds while said pair of molds is open, said stripping means including a rod rotatable about its axis and reciprocating with and relatively to the molds and operating during the final part of a revolution of said pair of molds, each rod being reciprocatory in response to the opening movement of each pair of molds successively and independently of the remaining rods.

14. In a machine of the character described, a series of female molds, a series of annular segments each toothed on its inner surface and each carrying one of the female molds, said segments being arranged in a ring, an externally toothed wheel engaging the toothed inner surfaces of the segments for continuously rotating the ring, a similar ring of annular toothed segments each carrying a male mold and mounted coaxially of the ring of female molds and rotated by said wheel as a unit with the ring of female molds, means for moving each male mold into the female mold, said mold moving means removing the male mold from the female mold at a selected point of the revolution of said rings, and means rotatable about the axis of and carried by and reciprocating relatively to each male mold for stripping the article molded by a male and female mold from each male mold successively and discharging the article from the machine, the stripping means for each mold operating independently of the corresponding stripping means of the remaining molds.

15. In a machine for continuously molding articles, means for forming, heating and advancing pellets, a pair of similar coaxially arranged continuously rotating rings of molds, one of said rings comprising a series of female molds and the other ring comprising a series of male molds each adapted to mate with a corresponding female mold, and means for loading each female mold with a pellet at a selected point of the revolution of the rings including belts moving in opposite directions, one of said belts receiving the pellets advanced by the first mentioned means, means for transferring the pellets from said one belt to the other belts and reciprocating means for moving the pellets from the last of the belts to the female mold.

16. In a machine for continuously molding internally threaded articles, a pair of similar coaxially arranged and rotating rings of molds, one of said rings comprising a series of segments carrying female molds and the other ring comprising a series of similar segments carrying male molds, each of the male molds having an externally threaded end portion adapted to enter the interior of a corresponding female mold in inward spaced relation to the molding surface of the female mold thereby to mold internal threads on the article between said end portion and said molding surface, means for moving each of the male mold segments successively out of said other ring to mate the corresponding male and female molds, means to separate said mating molds, while the article is carried by the male mold by returning the male mold segment to its place in said other ring at a selected point of the revolution of the rings, and means for stripping the article molded by said mating molds from the male mold comprising a stripping rod passing through each of the male molds in inward spaced relation to the threads of the male mold and rotatable relatively to said threads and means for rotating and simultaneously reciprocating each of the rods independently of the remaining rods and independently of the rotation of the threaded end portion of the corresponding male mold.

17. In a machine for continuously molding articles, a series of wedge-shaped segments each having flat inwardly converging sides and each arranged normally in a position in which the segments are arranged in an annular ring with the flat side of one segment in contact with the adjacent flat side of an adjacent segment, each of the segments having an arcuate outer end forming part of the outer surface of the ring and having a generally arcuate inner end forming part of the inner surface of the ring, each of the segments carrying a female mold, a similar coaxial ring of male mold carrying segments, means engaging the inner ends of all of the segments for continuously rotating the rings as a unit, and means for relatively reciprocating mating male and female mold carrying segments out of the normal position thereof in the ring of which the segment forms a part and out of contact with the remaining segments as said mating segments reach a predetermined point in the revolution of the rings.

18. A machine according to claim 17 in which each of the segments and the rotating means is provided with a locking element, the locking element of the segment engaging the locking element of the rotating means and cooperating therewith to lock the segments against rotation relatively to the rotating means while permitting axial reciprocation of the segments relatively to each other and to the rotating means.

19. In a machine of the character described, a ring of continuously rotating female mold-carrying segments, each segment being in the form of a part of an annular ring and having a pair of inwardly converging flat sides and being internally toothed, the non-corresponding flat sides of adjacent segments being adjacent each other, a similar ring of male mold-carrying segments, means for successively mating corresponding male and female molds by the successive movement of the selected segments axially out of the rings of which the segment forms a part during the rotation of the rings, and means for rotating the rings as a unit comprising a toothed wheel meshing with the teeth of the segments at all times, said wheel locking the segments against relative movement except in a direction axially of the ring.

20. In a machine of the character described, means for forming plastic pellets, a belt having a substantially horizontal upper reach for receiving pellets in succession from said means and thereby advancing the pellets, fixed electrically energized means at the upper and lower faces of the upper reach of the belt for producing an electrically charged field through the pellets and the belt for internally heating the pellets on the belt by induction heating during the passage of the pellets past the electrically energized means and through the field, a pair of reciprocating mating molds rotatable together about an axis spaced from said molds, means for removing a heated pellet from the belt and for advancing the heated pellet into one of the molds, means for rotating the mating molds as a unit about said axis, and means for relatively reciprocating said molds first in one direction to compress the pellet and then after an interval in the opposite direction to separate the molds.

21. In a machine of the character described, a continuously rotatable ring of female molds, said ring being in the form of an internal gear consisting of a series of independently movable segments each forming part of the gear, a similar ring of male molds rotatable as a unit with the ring of female molds, a common locking gear engaging all of the segments, and means for reciprocating the segments toward and from each other and relatively to the locking gear at predetermined points in a revolution of said rings and while all of said segments remain in engagement with the locking gear.

22. In a continuous machine of the character described, a ring of continuously rotating female molds, a similar ring of male molds, means for successively mating corresponding male and female molds of the rings during the rotation thereof and for separating said mating molds including a first cam for reciprocating the male molds, a plunger passing through each male mold and normally reciprocating therewith and also normally rotating continuously with the ring of male molds as a unit, and means to rotate and simultaneously to move the plunger axially relatively to the male mold and independently of the remaining plungers to strip an article molded on the male mold after said mating molds have been separated, said last mentioned means including a second cam in part of identical contour with the first cam to move the plunger and the male mold as a unit and in part of different construction from the first cam.

JOHN HOCH.

REFERENCES CITED

The following references are of record in the file of this patent:

UNITED STATES PATENTS

| Number | Name | Date |
| --- | --- | --- |
| 1,959,612 | Burke | May 22, 1934 |
| 2,304,141 | Bergmann | Dec. 8, 1942 |
| 2,308,632 | Stenberg | Jan. 19, 1943 |
| 2,336,212 | Baron et al. | Dec. 7, 1943 |
| 2,351,713 | Sayre | June 20, 1944 |

FOREIGN PATENTS

| Number | Country | Date |
| --- | --- | --- |
| 422,232 | Great Britain | Jan. 8, 1935 |